United States Patent
Neugebauer et al.

(10) Patent No.: US 8,700,332 B2
(45) Date of Patent: Apr. 15, 2014

(54) OPERATING DEVICE FOR A MOTOR VEHICLE

(75) Inventors: Moritz Neugebauer, Berlin (DE);
Mirko Langnickel, Berlin (DE);
Tatjana Kruscha, Braunschweig (DE);
Enrique Rodriguez, Mountain View, CA (US); Brian Lathrop, San Jose, CA (US)

(73) Assignee: Volkswagen AG, Wolfsburg (DE)

( * ) Notice: Subject to any disclaimer, the term of this patent is extended or adjusted under 35 U.S.C. 154(b) by 1011 days.

(21) Appl. No.: 12/268,284

(22) Filed: Nov. 10, 2008

(65) Prior Publication Data

US 2010/0121501 A1    May 13, 2010

(51) Int. Cl.
*G01C 21/00* (2006.01)
*G01C 21/36* (2006.01)

(52) U.S. Cl.
CPC ........ *G01C 21/3608* (2013.01); *G01C 21/3664* (2013.01)
USPC ......................................................... 701/539

(58) Field of Classification Search
USPC ............................................ 701/211, 1, 539
See application file for complete search history.

(56) References Cited

U.S. PATENT DOCUMENTS

| | | | |
|---|---|---|---|
| 5,689,619 A * | 11/1997 | Smyth .............................. | 706/45 |
| 6,157,403 A | 12/2000 | Nagata | |
| 6,675,075 B1 | 1/2004 | Engelsberg et al. | |
| 6,853,972 B2 * | 2/2005 | Friedrich et al. .............. | 704/275 |
| 2005/0175218 A1 | 8/2005 | Vertegaal et al. | |
| 2006/0110008 A1 | 5/2006 | Vertegaal et al. | |
| 2007/0016426 A1 | 1/2007 | Hershey et al. | |
| 2007/0024579 A1 * | 2/2007 | Rosenberg .................... | 345/156 |
| 2007/0040892 A1 | 2/2007 | Aoki et al. | |
| 2007/0057781 A1 | 3/2007 | Breed | |
| 2007/0081090 A1 | 4/2007 | Singh | |
| 2007/0194902 A1 * | 8/2007 | Blanco et al. ................. | 340/461 |
| 2007/0233380 A1 * | 10/2007 | Tanaka .......................... | 701/211 |
| 2007/0256027 A1 | 11/2007 | Daude | |
| 2008/0021598 A1 | 1/2008 | Daude et al. | |
| 2008/0201039 A1 * | 8/2008 | Matsuoka et al. .............. | 701/41 |
| 2009/0125233 A1 * | 5/2009 | Shibasaki ..................... | 701/208 |

FOREIGN PATENT DOCUMENTS

| | | |
|---|---|---|
| DE | 199 51 001 | 5/2001 |
| DE | 695 24 829 | 6/2002 |
| DE | 103 60 655 | 7/2005 |
| DE | 103 60 656 | 7/2005 |
| DE | 10 2005 023 214 | 11/2006 |
| EP | 0 702 355 | 3/1996 |
| JP | 11-263145 | 9/1999 |
| WO | WO 98/15964 | 4/1998 |

OTHER PUBLICATIONS www.tobii.com/archive/files/17992/Tobii_X120_Eye_Tracker_product_leaflet.pdf.aspx., [retrieved from internet Aug. 3, 2009].
www.tobii.com/market_research_usability/products_services/tobii_x120_eye_tracker.aspx..; copyright 2008. [retrieved from internet Aug. 3, 2009].
A. Oh, et al., "*Evaluating Look-to-Talk: A Gaze-Aware Interface in a Collaborative Environment*," Proceedings of CHI, pp. 650-651 (2002).
Q. Zhang, et al., "*Designing a Robust Speech and Gaze Multimodal System for Diverse Users*," Information Reuse and Integration 2003, IEEE International Conference, pp. 354-361 (Oct. 27-29, 2003).

\* cited by examiner

*Primary Examiner* — Amee A Shah
(74) *Attorney, Agent, or Firm* — Kenyon & Kenyon LLP

(57) ABSTRACT

In a method for the operator control of a motor vehicle having a display for displaying variable information, a symbol assigned to a function pertaining to the motor vehicle is shown with the aid of the display, the viewing direction of an operator of the motor vehicle is ascertained, and the function pertaining to the motor vehicle is subsequently executed in response to recognition of an acoustic command assigned to the function pertaining to the motor vehicle, while the viewing direction is aimed toward the display.

12 Claims, 5 Drawing Sheets

OPERATING DEVICE FOR A MOTOR VEHICLE

FIELD OF THE INVENTION

The present invention relates to an operating device for a motor vehicle, e.g., having a display system for displaying variable information, an eye tracker for ascertaining the viewing direction of an operator of the motor vehicle, and a microphone for the acoustic input of commands.

BACKGROUND INFORMATION

German Published Patent Application No. 199 51 001 describes a device for displaying information in a vehicle, the device having various devices for the display; the various devices for the display displaying the information; various data sources making the information available; the device having various devices for detecting the viewing direction of a driver of the vehicle; the devices for detecting the viewing direction detecting the viewing direction of the driver; the device having a computer; the computer being connected to the devices for detecting the viewing direction and to the various devices for the display; the computer obtaining the viewing direction of the driver of the vehicle from the devices for detecting the viewing direction; and the computer passing on the viewing direction of the driver of the vehicle to the various devices for the display so that the various devices for the display therefore show the information as a function of the viewing direction of the driver of the vehicle.

U.S. Patent Application Publication No. 2007/0057781 describes what is referred to as a heads-up display, integrated into a motor vehicle, that interacts with a voice-recognition system and/or gesture-recognition system. Further operating devices for motor vehicles are described, for example, in Japanese Published Patent Application No. 11-263145, German Published Patent Application No. 103 60 655, German Published Patent Application No. 10 2005 023 214, German Published Patent Application No. 103 60 656 and PCT International Published Patent Application No. WO 98/15964.

European Published Patent Application No. 0 702 355 and German Published Patent Application No. 695 24 829 describe a voice-recognition device for recognizing input speech, that includes a detector for detecting the point toward which the eyes of a user are focused on a display screen, as well as a modification device for modifying recognition processing for a voice recognition in accordance with the point detected by the detector. Moreover, the voice-recognition device includes a recognition device for performing the voice recognition in accordance with the recognition processing modified by the modification device. In this context, the modification device is arranged in particular to modify classes of recognition information, which are to be used for the voice recognition, in accordance with the point detected by the detector, and to set a plurality of fields, each of which is specific to a different class of recognition information.

SUMMARY

Example embodiments of the present invention improve the operator control of a motor vehicle. In so doing, the improvement is to be aimed in particular at permitting a precise and rapid operator control of the motor vehicle, the driver being distracted as briefly as possible or not at all from what is happening on the road. Moreover, the intention is to take into consideration the special circumstances with regard to a particular background noise in the vehicle interior, particularly at high speeds.

According to example embodiments of the present invention, a method for the operator control of a motor vehicle having a display for displaying variable information, includes: representation of a symbol, assigned to a function pertaining to the motor vehicle, with the aid of the display; ascertaining the viewing direction of an operator of the motor vehicle; optional selection of the symbol when the eye of the operator of the motor vehicle is directed toward the symbol; optional identification of the selected symbol; and subsequent execution of the function pertaining to the motor vehicle in response to the recognition of an acoustic command assigned to the function pertaining to the motor vehicle while the viewing direction is aimed toward the display, or subsequent execution of the function pertaining to the motor vehicle and assigned to the selected symbol in response to recognition of an acoustic command assigned to the function pertaining to the motor vehicle.

For example, a function pertaining to a motor vehicle may be an air conditioner or automatic climate control, a navigation system, a telephone, a window lift, etc., or a screen form, displayable by a display device, for operating an air conditioner or automatic climate control, a screen form, displayable by a display device, for operating a navigation system, a screen form, displayable by a display device, for operating a telephone, etc. Further examples for functions pertaining to the motor vehicle along these lines are described in more detail below.

The input of an acoustic command while the direction of view is pointed toward the display may be understood particularly narrowly, that is, only an acoustic command is accepted which has occurred while at the same time the direction of view is aimed toward the display. However, the input of an acoustic command while the direction of view is pointed toward the display may also be understood such that a close temporal relationship exists between the acoustic command and the pointing of the direction of view toward the display. In this context, in particular it is provided that the eye is initially directed toward the display, and during or shortly after this state, the corresponding acoustic command is given. Shortly thereafter in this sense is intended especially to be understood as a time span of no more than, e.g., 2 seconds.

A selected symbol may be identified acoustically and/or visually. For example, a selected symbol may be highlighted visually, e.g., by formation in color, by special brightness or other graphic symbols such as, for example, a pronounced border. In the case of an acoustic identification of the selected symbol, for example, the symbol selected may be output acoustically, or the operator may be prompted acoustically to input an associated acoustic command. A prompt to input an acoustic command is an exemplary embodiment for an identification of a selected symbol.

Example embodiments of the present invention permit a driver (or passenger) to operate vehicle functionalities via a graphical user interface with assistance of voice recognition. In so doing, the driver is able to operate or input vehicle or infotainment functionalities, menus or information such as names of people, communities, objects, buildings, regions or streets, as well as numbers (house numbers, building numbers, telephone numbers) both via the manual control of operating elements and via voice commands.

A symbol may be selected, or the function pertaining to the motor vehicle, e.g., the information pertaining to the motor vehicle and assigned to the selected symbol, may be executed only when the eye of the operator of the motor vehicle is directed toward the symbol longer than a predefined limiting value.

It may be provided that the viewing direction of the operator of the motor vehicle is ascertained or the function pertaining to the motor vehicle is executed only when an operating element for activating the eye tracker has been manipulated beforehand.

According to example embodiments of the present invention, an operating device for a motor vehicle includes: a display for displaying variable information; an eye tracker for ascertaining the viewing direction of an operator of the motor vehicle; a microphone for the acoustic input of commands; and a control for: the representation of a symbol, assigned to a function pertaining to the motor vehicle, with the aid of the display; the optional selection of the symbol when the eye of the operator of the motor vehicle is directed toward the symbol; the optional identification of the selected symbol; and the subsequent execution of the function pertaining to the motor vehicle in response to the recognition of an acoustic command assigned to the function pertaining to the motor vehicle and picked up by the microphone while the viewing direction is aimed toward the display, or subsequent execution of the function pertaining to the motor vehicle and assigned to the selected symbol in response to recognition of an acoustic command assigned to the function pertaining to the motor vehicle.

An exemplary eye tracker is described, for example, in the following Internet pages:
www.tobii.com/archive/files/17992/Tobii-X120_Eye_Tracker_product_leaflet.pdf.aspx
www.tobii.com/market_research usability/products_services/tobii_x120_eye_tracker.aspx.

The operating device may include an operating element for activating the eye tracker.

According to example embodiments of the present invention, a method for the operator control of a motor vehicle having a display system for displaying variable information, includes: representation of a first symbol, assigned to a first function pertaining to the motor vehicle, with the aid of the display system; representation of at least one second symbol, assigned to a second function pertaining to the motor vehicle, with the aid of the display system; ascertainment of the viewing direction of an operator of the motor vehicle; selection of a symbol toward which the eye of the operator of the motor vehicle is directed; identification of the selected symbol; and execution of the function pertaining to the motor vehicle and assigned to the selected symbol in response to the recognition of an acoustic command assigned to the function pertaining to the motor vehicle.

A display system may include a single display. However, a display system may also include a plurality of spatially separated displays.

A symbol may be selected only if an operating element for activating the eye tracker is manipulated. A symbol may be selected only if an eye of the operator of the motor vehicle is directed toward the symbol longer than a predefined limiting value.

According to example embodiments of the present invention, an operating device for a motor vehicle includes: a display system for displaying variable information; an eye tracker for ascertaining the viewing direction of an operator of the motor vehicle; a microphone for the acoustic input of commands; and a control for: the representation of a first symbol, assigned to a first function pertaining to the motor vehicle, with the aid of the display system; the representation of at least one second symbol, assigned to a second function pertaining to the motor vehicle, with the aid of the display system; the selection of a symbol toward which the eye of the operator of the motor vehicle is directed; the identification of the selected symbol; and the execution of the function pertaining to the motor vehicle and assigned to the selected symbol in response to the recognition of an acoustic command assigned to the function pertaining to the motor vehicle and picked up by the microphone.

The operating device may include an operating element for activating the eye tracker.

According to example embodiments of the present invention, a method for the operator control of a motor vehicle having a defined control-activation location and a microphone, includes: ascertaining the viewing direction of an operator of the motor vehicle; checking whether the viewing direction of the operator is turned toward the control-activation location; evaluation of an output signal of the microphone for the purpose of recognizing acoustic commands; and execution of a function pertaining to the motor vehicle and assigned to the control-activation location in response to the recognition of an acoustic command assigned to this function, particularly while the direction of view is aimed at the control-activation location.

A control-activation location may be any (selected) spot of the motor vehicle. In this context, it may be provided that a location in the motor vehicle becomes the control-activation location merely by corresponding selection, without it itself being changed. Thus, for example, a control-activation location may be a side mirror or a point in the interior of the motor vehicle in the area of the side mirror. However, a control-activation location may also be a window lift or a display.

The input of an acoustic command while the direction of view is pointed toward the control-activation location may be understood particularly narrowly, that is, only an acoustic command is accepted which has occurred while at the same time the direction of view is aimed toward the control-activation location. However, the input of an acoustic command while the direction of view is pointed toward the control-activation location may also be understood such that a close temporal relationship exists between the acoustic command and the pointing of the direction of view toward the control-activation location. In this context, in particular it is provided that the eye is initially directed toward the control-activation location, and during or shortly after this state, the corresponding acoustic command is given. Shortly thereafter in this sense is intended especially to be understood as a time span of no more than, e.g., 2 seconds.

The function pertaining to the motor vehicle may be executed only if an operating element for activating the eye tracker is manipulated and/or if the eye of the operator of the motor vehicle is directed toward the control-activation location longer than a predefined limiting value.

According to example embodiments of the present invention, an operating device for a motor vehicle which includes a defined control-activation location, includes: an eye tracker for ascertaining the viewing direction of an operator of the motor vehicle; a microphone for the acoustic input of commands; and a control for: checking whether the viewing direction of the operator is turned toward the control-activation location; and execution of a function pertaining to the motor vehicle and assigned to the control-activation location in response to the recognition of an acoustic command assigned to this function, particularly while the direction of view is aimed at the control-activation location.

The operating device may include an operating element for activating the eye tracker.

The eye of the driver toward a defined display or a defined control-activation location leads to an expectancy of the system for spoken commands for functions displayed there (fuel gauge, fuel-tank warning, servicing prompt, tire-pressure system, TMC (Traffic Message Channel) radio warnings, settings for navigation, media and on-board computer), that is to say, for functions allocated to this control-activation location. This leads to a reproducible improvement in the recognition quality of the voice commands by dynamic adaptation of the available commands for voice recognition even in a noisy environment. This also holds true for assistance systems: If the driver looks at a control-activation location of an assistance system such as, for example, at the left outside mirror where (possibly the display and) the effective site of the sensor for the assistance system is also situated, and speaks the command "side assist" or "lane assist," this causes the settings for the assistance system "side assist" or lane assist" to be called up on the navigation display, for example. This leads to a marked reduction in submenus for an operating device as well as a rapid and easy directing to settings of many different systems in the vehicle by linking the spot being viewed and the voice command. A further advantage is perceptibly reduced distraction from road traffic.

In example embodiments of the present invention, the long-term evaluation and collection of all viewing directions of the driver at defined displays or control-activation locations is provided over defined times. This leads to an expectancy of the system for spoken commands for functions displayed there, internal and person-specific storage of these "frequency-pattern and view-pattern ROIs," as well as voice commands. As above, this person-specific data results in an individual adaptation of the recognition quality of the voice commands by dynamic adaptation of the vocabularies for voice recognition.

According to example embodiments of the present invention, a method for the operator control of a motor vehicle includes: visual output of a warning or action prompt with the aid of a display device; checking whether the viewing direction of the operator is turned toward the display device during the visual output of a warning or action prompt; and acoustical output of the warning or action prompt or an audible notification of the visual output of a warning or action prompt if the viewing direction of the operator is not turned toward the display device within a predetermined time after the visual output of the warning or action prompt begins.

According to example embodiments of the present invention, a motor vehicle includes: a display device for the visual output of a warning or action prompt; an eye tracker for ascertaining the viewing direction of an operator of the motor vehicle; a loudspeaker; and a control for the acoustical output of the warning or action prompt or an audible notification, with the aid of the loudspeaker, of the visual output of a warning or action prompt if the viewing direction of the operator is not turned toward the display device within a predetermined time after the visual output of the warning or action prompt begins.

The following example clarifies this: If the driver has not observed by eye (has not focused by eye on) an indicator important for him/her, such as warnings, action prompts, information, the system may optionally (at request of the driver) additionally output this indicator by voice output (verbal description of the indicator). For example, the vehicle system asks the driver via a voice output: "You have not observed an indicator/indicators (i.e., instruction, warning, action recommendation), do you want to hear these indicators as voice output?" If one indicator has been concealed by another, the vehicle system may ask, for example: "An indicator was concealed, do you want to hear these indicators as voice output?" The answer yes or no is expected from the driver in each case. For example, the vehicle system may also ask the driver via voice output, whether he/she would like to have the indicator displayed again. This question is also able to be answered with yes or no by the driver.

For example, the driver may be informed by the vehicle system about indicators not observed (that is, informed that information was not noticed by the driver). Using a command (such as "voice output," "repeat," "display again," etc.), for example, the driver may thereupon trigger a repeated output of information.

Moreover, for example, the driver may configure the vehicle system to the effect that, as desired, he/she be informed again by the vehicle system by voice output of the indicators not observed by eye or the indicators which the driver would like to have conveyed again by voice output. The configuration with respect to the desired additional voice output of information (general information, instruction, warning, action recommendation, etc.) may also be changed while driving. This may also be implemented individually for the category of information. Via the configuration of the vehicle system, possibly also during travel, the driver is in each case able to adjust separately (possibly also via voice commands) whether, for example, only warnings and or instructions and or action recommendations and/or general further information, in addition to the output via displays, should also take place or be output via voice output, or, for example, should only occur when the corresponding indicator has not been observed by the driver by eye for a certain length of time (with in each case a different time duration depending on the information category) and/or was already dissolved to a different indicator.

The instant for the repeated information output (as voice output and/or indicator) may be a function of the instantaneous driving situation (driver condition, vehicle condition, passenger-compartment situation, surroundings situation, etc.).

If the driver often focuses by eye on certain indicators (information), or scarcely focuses by eye on important information, the vehicle system may ask the driver by voice, whether this information should be imaged on a more suitable display area.

According to example embodiments of the present invention, a motor vehicle includes: an eye tracker for ascertaining the viewing direction of an operator of the motor vehicle; optionally a camera for recording an area surrounding the motor vehicle; an operating configuration for the acoustic and/or manual request of information; and a control for the output of information with regard to an object toward which the viewing direction of an operator is turned.

Thus, for example, it may be provided that, when the driver (or optionally another passenger) has selected or set his/her sights (by corresponding viewing direction) on a POI (point of interest) outside of the vehicle, in response to the touch of a button by the driver (or optionally by the other passenger), or optionally also without further manual confirmation, the motor vehicle conveys information with regard to the POI via voice output (e.g., clarifying information with respect to places of interest, cities, buildings, weather, traffic jams, etc.).

A motor vehicle may be, in particular, a land vehicle that may be used individually in road traffic. In particular, motor vehicles are not restricted to land vehicles having an internal combustion engine.

Further features and aspects of example embodiments of the present invention are described in more detail below with reference to the appended Figures.

DETAILED DESCRIPTION

Figure 1:
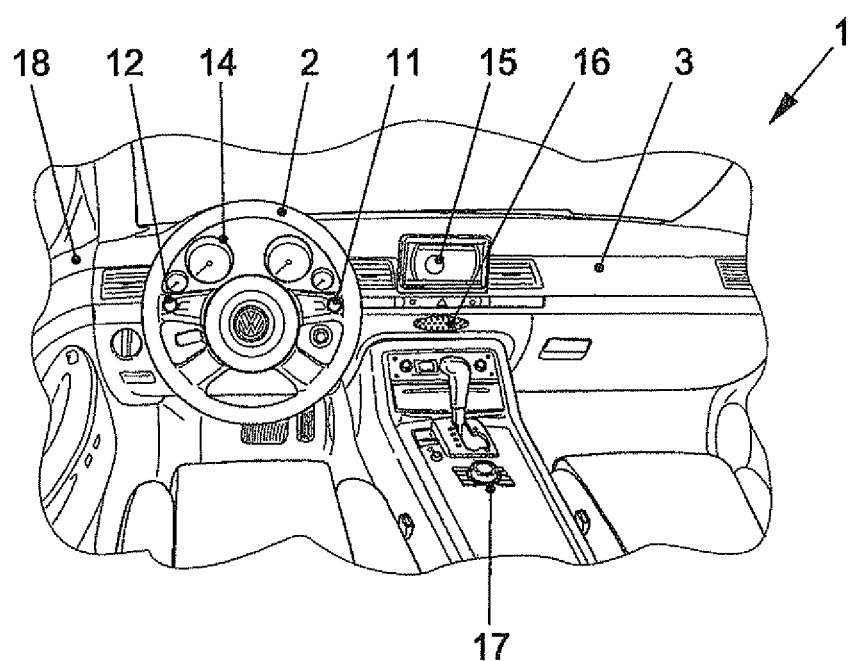
FIG. 1 illustrates an exemplary embodiment of an interior view of a motor vehicle.
Figure 2:
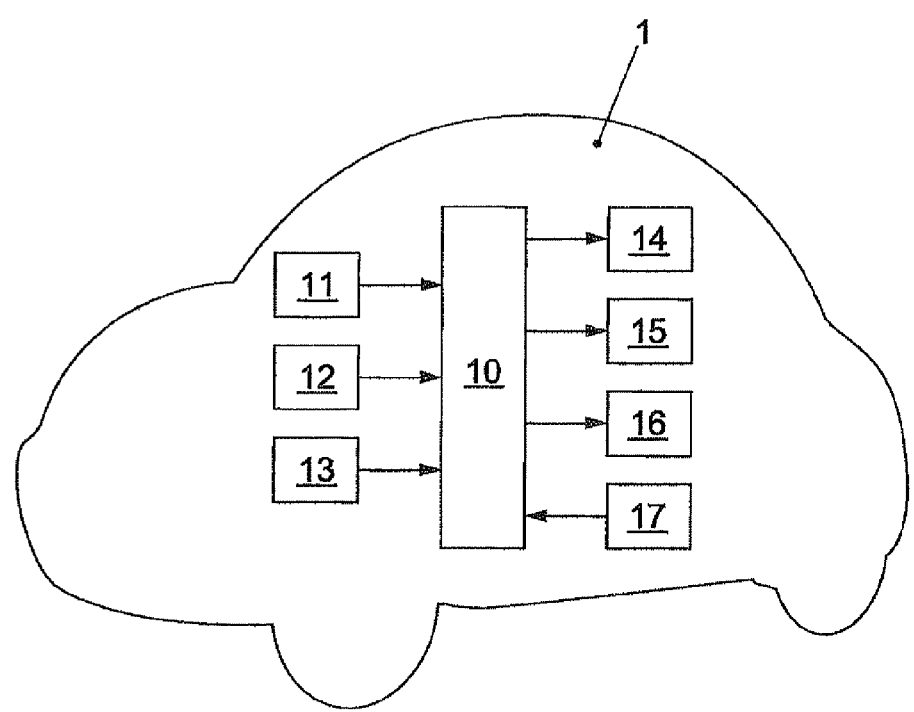
FIG. 2 schematically illustrates an exemplary embodiment of a motor vehicle having an operating device.

FIG. 1 illustrates the interior view of a motor vehicle 1, which is schematically illustrated in FIG. 2. Motor vehicle 1 includes an operating device having a microphone 11, disposed on steering wheel 2 of motor vehicle 1 in the exemplary embodiment, for the input of acoustic commands (particularly for the input of voice commands), and having a display 15 located on dashboard 3 of motor vehicle 1. In addition, the operating device includes an eye tracker 13, as well as an instrument cluster 14, arranged in front of steering wheel 2, that includes a display for displaying variable information. Moreover, the operating device includes a control 10 for controlling the display of instrument cluster 14 as well as display 15.

Figure 3:
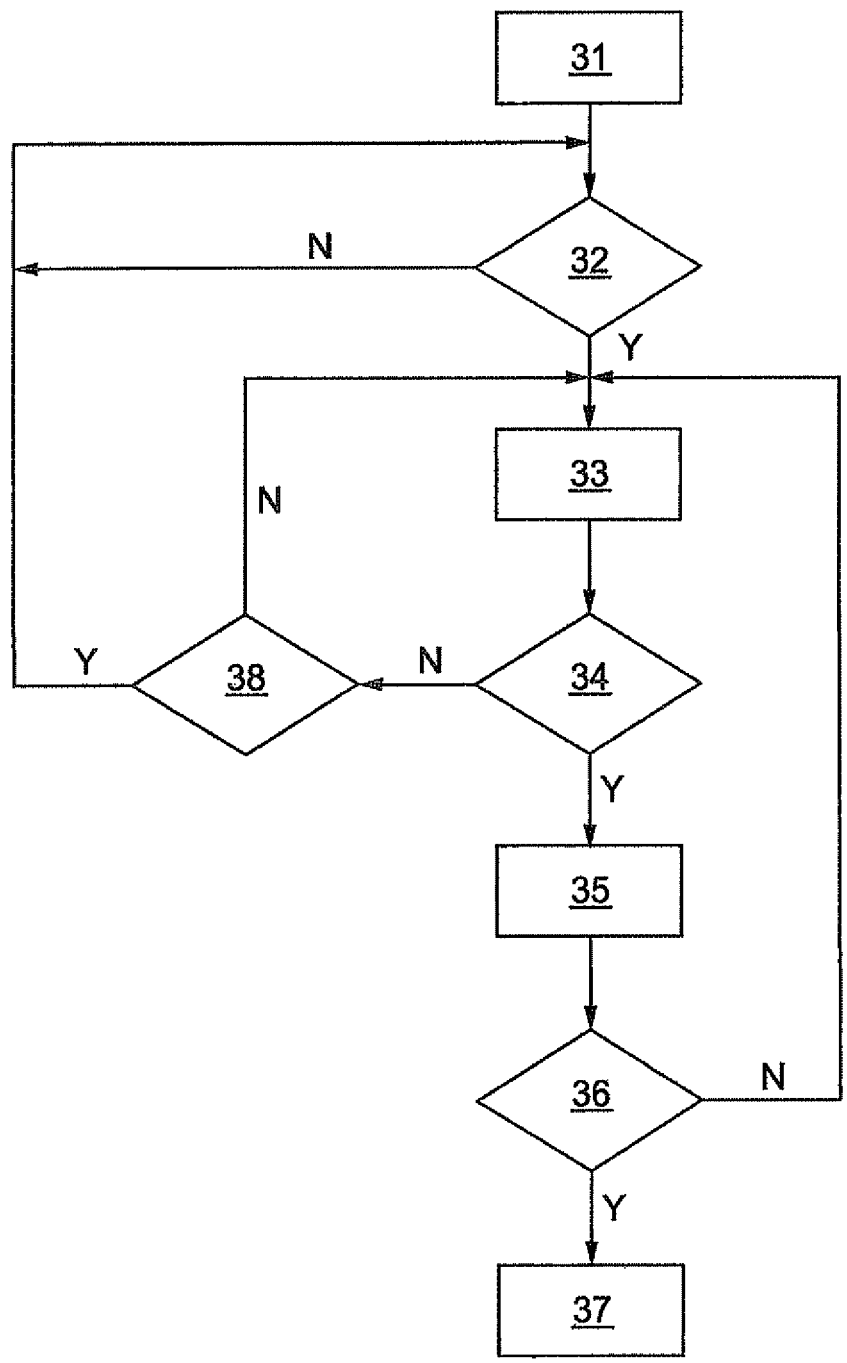
FIG. 3 illustrates a method sequence.
Figure 4:
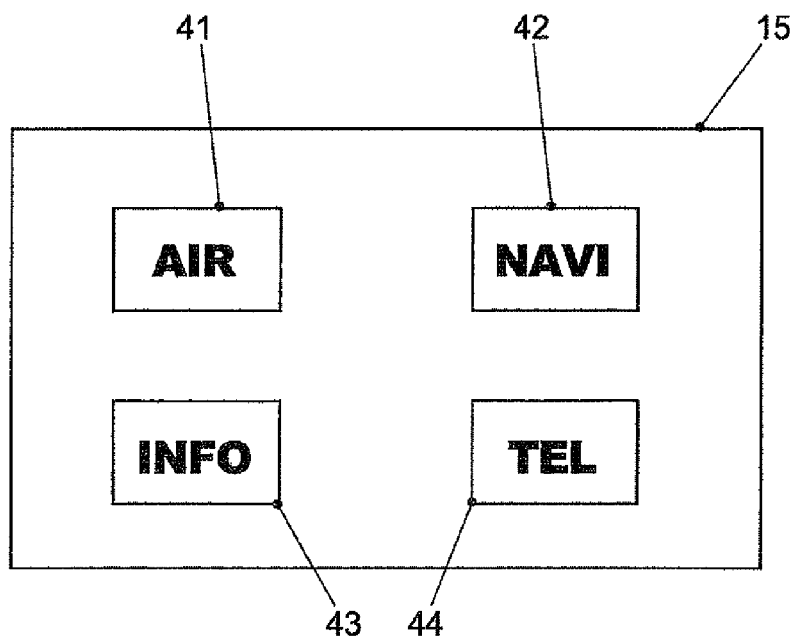
FIG. 4 schematically illustrates a display by which various symbols, that are assigned to individual functions of the motor vehicle, are represented.

FIG. 3 shows a flowchart of a method, implemented in control 10, for the operator control of a motor vehicle 1. In this context, initially in 31, information or symbols of this information are shown on the display of instrument cluster 14 and/or on display 15. The indication of symbols is shown, for example, in FIG. 4 for display 15. In that case, a symbol 41 for operating an air conditioner or for calling up a screen form for operating an air conditioner, a symbol 42 for operating a navigation system or for calling up a screen form for operating a navigation system, a symbol 43 for operating an infotainment system or for calling up a screen form for operating an infotainment system, as well as a symbol 44 for operating a telephone or for calling up a screen form for operating a telephone are represented with the aid of display 15.

Following 31 is an optional query 32 as to whether an operating element 12 (see, FIG. 2) for activating an eye tracker has been manipulated. If such a manipulation has taken place, then following query 32 is a step 33 in which a viewing direction is detected with the aid of eye tracker 13 (see, FIG. 2). On the other hand, if no such manipulation has taken place, then query 32 is repeated, in doing which, possibly only a certain number of repetitions being allowed, or repetition only being carried out so long as the indicator content shown (with the aid of the display) does not change.

Figure 5:
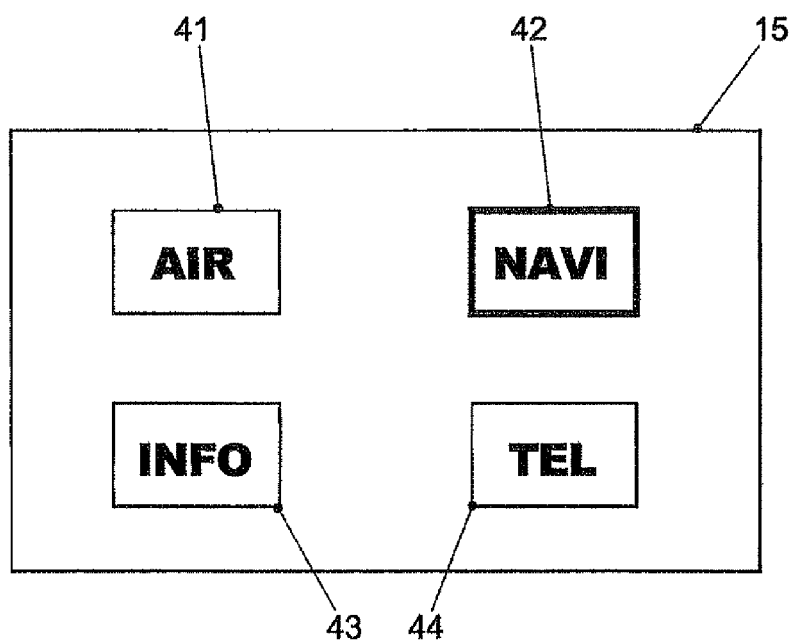
FIG. 5 schematically illustrates the display illustrated in FIG. 4 with a selected symbol.

Following 33 is a query 34 as to whether a direction of view has been aimed toward a symbol, represented with the aid of the display of instrument cluster 14 or display 15, or toward a control-activation point for at least the length of a limiting value. If the direction of view has been aimed at a symbol, represented with the aid of the display of instrument cluster 14 or display 15, or at a control-activation point for at least the length of a limiting value, then query 34 is followed by 35 in which the symbol toward which the view is directed is selected and the selected symbol is identified. This is illustrated schematically in FIG. 5. In this case, the viewing direction, that is, the eye of the driver in the exemplary embodiment is directed toward symbol 42 for at least the length of a limiting value. Symbol 42 is selected and identified as selected by a border. Alternatively or additionally, it may be output acoustically via a loudspeaker, denoted by reference numeral 16 (see, FIG. 2), of the operating device, that symbol 42 for a navigation device has been selected. An acoustic prompt for the input of a voice command to select the navigation system may also occur.

Figure 6:
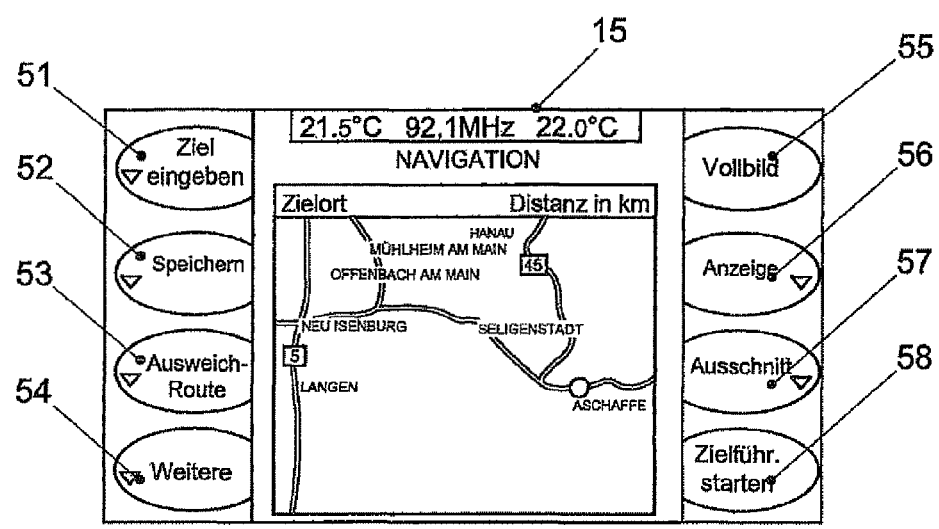
FIG. 6 schematically illustrates the display illustrated in FIG. 4 with the representation of a screen form for operating a navigation system.

After 35 is a query 36 as to whether, within a predetermined waiting time of 5 seconds, for example, an acoustic command assigned to the selected symbol, thus, for examples to symbol 42, is input. If no acoustic command assigned to the selected symbol is input, then query 36 is followed by 33. However, if an acoustic command assigned to the selected symbol is input within the predetermined waiting time, then query 36 is followed by 37 in which this acoustic command is executed. For example, in the case of the example described with reference to FIG. 5, this would be the acoustic command "navi" or "navigation system." If this acoustic command is input or pronounced within the predetermined query time, then—as illustrated in FIG. 6—a screen form for operating a navigation system is pictured with the aid of display 15. Starting from this screen form, the navigation system may be operated in a similar manner, by selecting the symbols denoted by reference numerals 51, 52, 53, 54, 55, 56, 57, 58. Alternatively or additionally, operator control may be accomplished using a control knob denoted by reference numeral 17 in FIG. 1.

If a direction of view is not aimed toward a symbol, shown with the aid of the display of instrument cluster 14 or display 15, or toward a control-activation point for at least the length of a limiting value, then query 34 is followed by a query 38 as to whether a predetermined second waiting time has elapsed. If the predefined second waiting time has elapsed, then query 38 is followed by query 32. Otherwise, query 38 is followed by 33.

If, in 33, it is recognized by eye tracker 13 that the direction of view is not pointing toward a symbol, represented with the aid of the display of instrument cluster 14 or display 15, but rather is pointing (at least for a length of a limiting value) toward a control-activation point denoted by reference numeral 18 in FIG. 1, then 33 is followed by query 34. If the viewing direction is aimed toward control-activation point 18 for at least the predetermined time, then in 35, it is communicated to the driver or operator that a function assigned to control-activation point 18 is selected, or he/she is prompted to input a voice command assigned to a function allocated to control-activation point 18.

If this voice command is given within the predetermined waiting time, then the function allocated to control-activation point 18, i.e., the function assigned to this voice command is executed (in 37). In the present exemplary embodiment, control-activation point 18 is allocated to a driver assistance system. If this function is selected and the acoustic command "side assist" is given, then the outputs of a driver assistance system are displayed with the aid of display or in a display of the side mirror.

LIST OF REFERENCE NUMERALS 1 motor vehicle
2 steering wheel
3 dashboard
10 control
11 microphone
12 operating element for activating an eye tracker
13 eye tracker 14 instrument cluster
15 display
16 loudspeaker
17 control knob
31, 33, 35, 37 action
32, 34, 36, 38 query
41, 42, 43, 44,
51, 52, 53, 54,
56, 57, 58 symbol

What is claimed is:

1. A method for operator control of a motor vehicle having a display adapted to display variable information, comprising:
representing a symbol, assigned to a function pertaining to the motor vehicle, with the aid of the display; ascertaining a viewing direction of an operator of the motor vehicle, and
subsequently executing, by a control of an operating device, the function pertaining to the motor vehicle in response to recognition of an acoustic command assigned to the function pertaining to the motor vehicle;
wherein the acoustic command is given within a predetermined time period after the viewing direction is aimed toward the display, when the viewing direction of the operator is no longer aimed directly toward the display.

2. The method according to claim 1, further comprising selecting the symbol when an eye of the operator of the motor vehicle is directed toward the symbol.

3. The method according to claim 2, further comprising identifying the selected symbol.

4. The method according to claim 3, further comprising subsequently executing the function pertaining to the motor vehicle and assigned to the selected symbol in response to the recognition of an acoustic command assigned to the function pertaining to the motor vehicle.

5. The method according to claim 1, further comprising selecting the symbol when an eye of the operator of the motor vehicle is directed toward the symbol longer than a predefined limiting value.

6. The method according to claim 5, further comprising identifying the selected symbol.

7. The method according to claim 6, further comprising subsequently executing the function pertaining to the motor vehicle and assigned to the selected symbol in response to the recognition of an acoustic command assigned to the function pertaining to the motor vehicle.

8. The method according to claim 1, further comprising selecting the symbol when an eye of the operator of the motor vehicle is directed toward the symbol provided an operating element for activating an eye tracker is manipulated.

9. The method according to claim 8, further comprising subsequently executing the function pertaining to the motor vehicle and assigned to the selected symbol in response to the recognition of an acoustic command assigned to the function pertaining to the motor vehicle.

10. The method according to claim 1, wherein the function pertaining to the motor vehicle is executed only if an operating element for activating an eye tracker is manipulated.

11. An operating device for a motor vehicle, comprising:
a display adapted to display variable information;
an eye tracker adapted to ascertain a viewing direction of an operator of the motor vehicle;
a microphone adapted to receive acoustic input of commands; and
a control adapted to:
show a symbol, assigned to a function pertaining to the motor vehicle, with the aid of the display;
subsequently execute the function pertaining to the motor vehicle in response to recognition of an acoustic command assigned to the function pertaining to the motor vehicle and picked up by the microphone;
wherein the acoustic command is given within a predetermined time period after the viewing direction is aimed toward the display, when the viewing direction of the operator is no longer aimed directly toward the display.

12. The operating device according to claim 11, further comprising an operating element adapted to activate the eye tracker.

* * * * *